(12) United States Patent
Pojidaev

(10) Patent No.: US 9,637,190 B2
(45) Date of Patent: May 2, 2017

(54) MODULAR INDUSTRIAL VEHICLE WITH ADAPTIVE OPERATING MODE AND ADAPTIVE CONTROLS

(75) Inventor: Sergei Pojidaev, Tomsk (RU)

(73) Assignee: Build Strong LLC, Aventura, FL (US)

( * ) Notice: Subject to any disclaimer, the term of this patent is extended or adjusted under 35 U.S.C. 154(b) by 0 days.

(21) Appl. No.: 14/426,681

(22) PCT Filed: Sep. 6, 2012

(86) PCT No.: PCT/US2012/053910
§ 371 (c)(1),
(2), (4) Date: Mar. 6, 2015

(87) PCT Pub. No.: WO2014/039041
PCT Pub. Date: Mar. 13, 2014

(65) Prior Publication Data
US 2015/0217819 A1   Aug. 6, 2015

(51) Int. Cl.
| | |
|---|---|
| G06F 7/70 | (2006.01) |
| B62D 63/02 | (2006.01) |
| E02F 3/96 | (2006.01) |
| E02F 9/00 | (2006.01) |
| E02F 9/26 | (2006.01) |
| E02F 9/20 | (2006.01) |
| B66C 23/36 | (2006.01) |

(52) U.S. Cl.
CPC ............ *B62D 63/025* (2013.01); *B66C 23/36* (2013.01); *E02F 3/96* (2013.01); *E02F 9/003* (2013.01); *E02F 9/2058* (2013.01); *E02F 9/265* (2013.01)

(58) Field of Classification Search
CPC .............................. B62D 63/025; B66C 23/36
See application file for complete search history.

(56) References Cited

U.S. PATENT DOCUMENTS

| | | | |
|---|---|---|---|
| 2,055,974 | A | 9/1936 | Greiner |
| 3,734,223 | A | 5/1973 | Anderson |
| 4,167,142 | A | 9/1979 | Ames |
| 4,266,483 | A | 5/1981 | Rannanmaki |
| 4,750,855 | A | 6/1988 | Anderson |
| 4,842,326 | A | 6/1989 | DiVito |
| 5,154,124 | A | 10/1992 | Madison |
| 6,923,285 | B1 | 8/2005 | Rossow et al. |
| 7,114,271 | B2 | 10/2006 | Chagnot et al. |
| 7,374,004 | B2 | 5/2008 | Kraimer et al. |

(Continued)

FOREIGN PATENT DOCUMENTS

| | | |
|---|---|---|
| AU | 2010200529 | 2/2009 |
| EP | 1486620 | 12/2004 |

(Continued)

OTHER PUBLICATIONS

ETF Mining Trucks, Mining Haulage for the 21st Century, http://www.etftrucks.eu/downloads/etf_brochure.pdf/, viewed Mar. 9, 2015.

(Continued)

*Primary Examiner* — Adam Alharbi
(74) *Attorney, Agent, or Firm* — Florek & Endres PLLC

(57) ABSTRACT

A modular industrial vehicle having one or more modules that communicate with a managing controller to provide an operating mode for the modular industrial vehicle based configuration and technical specifications of the one or more modules.

17 Claims, 11 Drawing Sheets

(56) References Cited

U.S. PATENT DOCUMENTS

| | | | |
|---|---|---|---|
| 8,011,462 B2 | 9/2011 | Davies et al. | |
| 8,046,541 B1* | 10/2011 | Dolev | G06F 13/1689 |
| | | | 711/154 |
| 2005/0000122 A1 | 1/2005 | Chagnot et al. | |
| 2006/0157605 A1 | 7/2006 | Ramun et al. | |
| 2006/0272874 A1 | 12/2006 | Kraimer et al. | |
| 2008/0314660 A1 | 12/2008 | Davies et al. | |
| 2012/0322433 A1* | 12/2012 | Moeller | H04W 4/021 |
| | | | 455/418 |
| 2014/0174839 A1* | 6/2014 | Steben | B62D 33/06 |
| | | | 180/9.23 |

FOREIGN PATENT DOCUMENTS

| | | |
|---|---|---|
| JP | 2007-205100 | 8/2007 |
| RU | 2055758 | 3/1996 |
| RU | 2243908 | 1/2005 |
| RU | 49788 | 2/2005 |
| RU | 2433057 | 2/2010 |
| RU | 2394717 | 7/2010 |
| RU | 2397885 | 7/2010 |
| WO | 96/37093 | 11/1996 |

OTHER PUBLICATIONS

Eckelkamp, Margy, Tractor with Electric Wheel Drives, http://www.agweb.com/article/tractor_with_electric_wheel_drives/, Nov. 15, 2011.

Farm Show, Deere's Revolutionary Electric Tractor, https://www.farmshow.com/view_articles.php?a_id=139, viewed Mar. 2015.

John Deere, http://www.deere.co.uk/en_GB/regional_home.page, viewed Mar. 2015.

* cited by examiner

MODULAR INDUSTRIAL VEHICLE WITH ADAPTIVE OPERATING MODE AND ADAPTIVE CONTROLS

This application is a National Stage Application under 35 U.S.C. §371 of International Application Number PCT/US2012/053910, filed Sep. 6, 2012, the entire contents of which are incorporated herein by reference in its entirety.

FIELD OF THE INVENTION

This invention relates to a modular industrial vehicle. More particularly, a modular industrial vehicle comprising one or more modules which each comprise a controller that communicates with a managing controller which provides an operating mode for the modular industrial vehicle based on the configuration and technical specifications of the one or more modules.

BACKGROUND OF THE INVENTION

Industrial heavy-duty equipment is often mounted on vehicular frames so that it can easily be transported between locations. It is common for the working executive mechanisms of the equipment to be permanently mounted to the vehicle frame, thus requiring industrial users to purchase a multitude of industrial vehicles, each suitable for only a limited range of tasks.

Modular vehicles are also known in the art as disclosed by U.S. Pat. No. 3,734,223, for example. However, the modular vehicles of the prior art merely comprise specific interchangeable parts which further lack the ability to communicate information to a managing controller of the modular vehicle. As a result, the modular vehicles of the prior art are unable to allow for complete customization and cannot change between different operating modes depending on the configuration of the vehicle.

SUMMARY OF THE INVENTION

It is an object of the present invention to provide a modular industrial vehicle with one or more modules that each comprise a controller which communicates with a managing controller that provides an operating mode for the modular industrial vehicle based on the configuration and technical specifications of the one or more modules.

It is also an object of the present invention to provide a modular industrial vehicle with operator controls wherein the functions performed by the controls are dependent upon the technical specifications and configuration of the modules which comprise the modular industrial vehicle.

It is an additional object of the present invention to provide a modular industrial vehicle comprising a managing controller which is in communication with a computer database containing data on one or more modules, including its technical specifications and operative capabilities, and which also allows additional module data sets to be added to the computer database.

Additional objectives, advantages and novel features of the invention will be set forth in part in the description which follows, and in part will become apparent to those skilled in the art upon examination of the following, or may be learned by practice of the invention.

One embodiment of the modular industrial vehicle of the present invention comprises:
a) a modular tractive complex which comprises:
  i) optionally one or more cabin modules;
  ii) one or more power unit modules;
  iii) one or more chassis modules which comprise:
    A) a frame module;
    B) a movement module; and
    C) optionally a wheel rotation module; and
  iv) optionally one or more frame pivot modules; and
b) optionally one or more working executive mechanism modules.

Another embodiment of the modular industrial vehicle of the present invention comprises:
a) a modular tractive complex which comprises:
  i) optionally one cabin module;
  ii) one power unit module;
  iii) one chassis module comprising:
    A) one frame module;
    B) one movement module; and
    C) optionally one wheel rotation module; and
  iv) optionally one frame pivot module;
b) optionally one or more additional frame modules;
c) optionally one or more additional frame pivot modules;
d) optionally one or more additional movement modules;
e) optionally one or more additional wheel rotation modules; and
f) optionally one or more working executive mechanism modules.

An additional embodiment of the modular industrial vehicle of the present invention comprises:
a) a modular tractive complex which comprises:
  i) optionally one or more cabin modules;
  ii) one or more power unit modules; and
  iii) one or more movement modules; and
b) optionally one or more working executive mechanism modules.

A further embodiment of the modular industrial vehicle of the present invention comprises:
a) a modular tractive complex which comprises:
  i) optionally one cabin module;
  ii) one power unit module; and
  iv) one movement module;
b) optionally one or more additional movement modules; and
c) optionally one or more working executive mechanism modules.

In embodiments of the present invention, one or more modules may comprise a controller which communicates with a managing controller that provides the required operating mode for the modular industrial vehicle based on the configuration and technical specifications of the one or more modules in communication with the managing controller.

DETAILED DESCRIPTION OF THE INVENTION

The present invention comprises a modular industrial vehicle. FIGS. 1-8 depict the various modules which can comprise the modular tractive complex of the modular industrial vehicle of the present invention. The present invention, however, contemplates additional modules not depicted in FIGS. 1-8.

Figure 1:
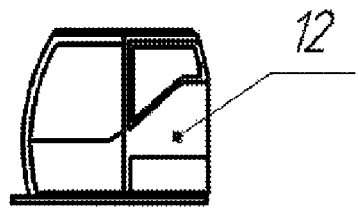
FIG. 1 is a side view of a cabin module of one embodiment of the modular industrial vehicle of the present invention.
Figure 2:
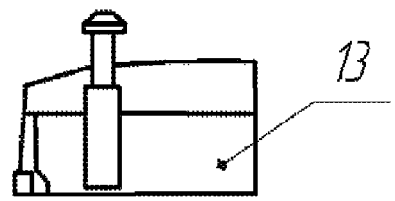
FIG. 2 is a side view of a power unit module of one embodiment of the modular industrial vehicle of the present invention.
Figure 3:
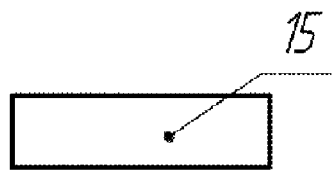
FIG. 3 is a side view of a frame module of one embodiment of the modular industrial vehicle of the present invention.
Figure 4:
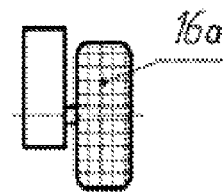
FIG. 4 is a front view of a wheel embodiment of the movement module for use with the modular industrial vehicle of the present invention.

FIG. 1 is an embodiment of a cabin module 12;

FIG. 2 is an embodiment of a power unit module 13;

FIG. 3 is an embodiment of a frame module 15;

FIG. 4 is an embodiment of a movement module wherein the movement means is a wheel 16*a;*

Figure 5:
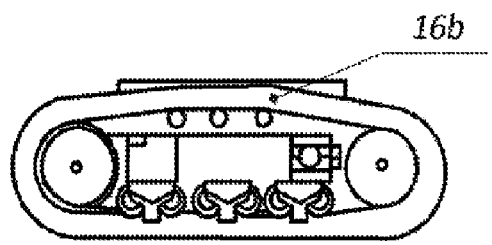
FIG. 5 is a side view of a track embodiment of the movement module for use with the modular industrial vehicle of the present invention.

FIG. 5 is an embodiment of a movement module wherein the movement means is a track 16*b;*

Figure 6:
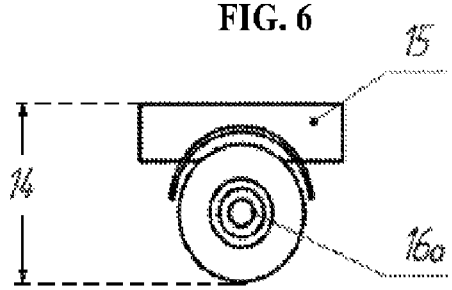
FIG. 6 is a side view of a chassis module comprising a frame module and a wheel embodiment of the movement module of an embodiment of the modular industrial vehicle of the present invention.
Figure 7:
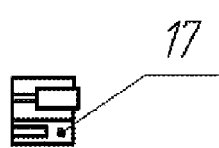
FIG. 7 is a side view of a frame pivot module of an embodiment of the modular industrial vehicle of the present invention.
Figure 8:
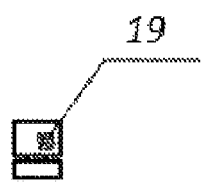
FIG. 8 is a side view of a wheel rotation module of an embodiment of the module industrial vehicle of the present invention.
Figure 9:
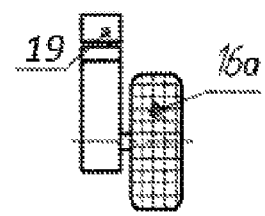
FIG. 9 is a front view of a wheel embodiment of a movement module attached to a wheel rotation module of an embodiment of the module industrial vehicle of the present invention.

FIG. 6 is an embodiment of a chassis module 14 which comprises a frame module 15 and a wheel embodiment 16*a* of the movement module 16;

FIG. 7 is an embodiment of a frame pivot module 17;

FIG. 8 is an embodiment of a wheel rotation module 19;

FIG. 9 is an embodiment of a movement module wherein the movement means is a wheel 16*a* which is attached to a wheel rotation module 19.

The modules can be combined in numerous configurations which would be readily ascertainable by a person of ordinary skill in the art. FIGS. 10, 13, 18, 27, 30, 34 and 37 are exemplary configurations of the modules to produce modular tractive complexes in accordance with the present invention. The modular tractive complex forms the structure to which the working executive mechanism module is affixed.

In embodiments of the present invention, the modular industrial vehicle comprises a modular tractive complex comprising optionally one or more cabin modules 12, at least one power unit module 13 and at least one chassis module 14 which comprises a frame module 15, a movement module 16 and optionally a wheel rotation module 19. Successive frame modules 15 may be connected by a frame pivot module 17 or the frame modules 15 can be directly connected to one another at their ends. The cabin module(s) 12 and the power unit module(s) 13 are attached, wholly or partially, to one or more of the frame modules 15. In another embodiment of the present invention, the modular industrial vehicle also comprises one or more working executive mechanism modules which can be attached to one or more frame modules 15, one or more frame pivot modules 17 and/or one or more movement modules 16. The movement module 16 may comprise a wheel embodiment 16a, a track embodiment 16b or a combination of the wheel 16a and track 16b embodiments.

In a further embodiment of the present invention, the modular industrial vehicle comprises optionally one or more cabin modules 12, at least one power unit module 13 and at least one movement module 16. The cabin module(s) 12 and the power unit module(s) 13 are attached, wholly or partially, to the movement module 16. In an additional embodiment of the present invention, the modular industrial vehicle also comprises one or more working executive mechanism modules which can be attached to the one or more movement modules 16. The movement module 16 may comprise a wheel embodiment 16a, a track embodiment 16b or a combination of the wheel 16a and track 16b embodiments.

In embodiments of the present invention, one or more modules may comprise a controller which communicates with a managing controller that provides the required operating mode for the modular industrial vehicle based on the configuration and technical specifications of the one or more modules in communication with the managing controller.

The cabin module(s) 12 hold the operator(s) of the modular industrial vehicle. Therefore, the cabin module 12 is of a sufficient size to comfortably fit at least one person, however, the cabin module 12 can be sized to fit more than one person if necessary. The cabin module 12 can comprise a controller which communicates information about the technical specifications and configuration of the cabin module 12 to a managing controller. The cabin module 12 can be equipped with attachment means for attachment to other modules. Suitable attachment means include, but are not limited to, hooks, straps, slots, bolts, threads, pins, magnets, clamps and the like.

The cabin module 12 may also house the managing controller of the modular industrial vehicle. In embodiments of the present invention a single managing controller resides in a single cabin module 12. In additional embodiments of the present invention, the managing controller resides on an exterior portion of the modular industrial vehicle or can be remote and held by a remote operator of the modular industrial vehicle or housed in a remote control station. The managing controller determines the appropriate operating mode of the modular industrial vehicle of the present invention. The managing controller is in communication with the controllers of each individual module containing a controller by any suitable means known to persons of ordinary skill in the art including, but not limited to, wired connections such as USB cables, Ethernet cables, FireWire cables, serial cables and the like; and wireless connection such as Wi-Fi, Bluetooth and the like. The managing controller receives information about the technical specifications and configuration of each individual module containing a controller. The managing controller also determines the technical possibilities of exploitation for the modular industrial vehicle as well as the choice of modes of operation based on the identity and configuration of each individual module containing a controller. The managing controller is also in communication with a computer database containing data on one or more modules, including its technical specifications and operative capabilities, and which also allows additional module data sets to be added to the computer database. The managing controller additionally uses software which interprets the identity and configuration of each individual module containing a controller, in conjunction with the computer database, to determine the technical possibilities of the configuration of the modular industrial vehicle.

The managing controller may also comprise a display which communicates the information processed by the managing controller to the operator(s) of the industrial modular vehicle. Any analog or digital display known to those of ordinary skill in the art and capable of displaying information about the technical specifications and configuration of each individual module containing a controller as well as the technical possibilities of exploitation for the modular industrial vehicle and the choice of modes of operation of the modular industrial vehicle is suitable for use in the present invention. The managing controller and the display may be housed in a single unit or separate units.

The managing controller may further comprise controls which allow the operator of the modular industrial vehicle to manipulate the various modules comprising the modular industrial vehicle. The managing controller and controls may be housed in a single unit or separate units. The controls may be of any type known to those of ordinary skill in the art including, but not limited to, levers, buttons, toggles and digital controls. The functions performed by the controls are dependent upon the technical specifications and configuration of the modules which comprise the modular industrial vehicle and upon the specific working executive mechanism module(s) attached to the modular industrial vehicle. For example, in an embodiment of the present invention where the working executive mechanism module is a mixer, the controls may perform functions such as spinning the mixing drum and pouring the contents from the mixing drum. Whereas, in an alternative embodiment of the present invention where the working executive mechanism module is a crane, the controls may perform functions such as raising the lift of the crane or rotating the lift of the crane. Thus, it is preferred, although not required, that the controls comprise digital controls. In an embodiment of the present invention the controls comprise a touch-screen interface. In addition, it is specifically contemplated that the modular industrial vehicle of the present invention may comprise multiple working executive mechanism modules. Therefore, the controls of the present invention should have the ability to control multiple working executive mechanism modules, either by providing a toggle to switch the function of the controls to correspond to the operating modes of the attached working executive mechanism modules or, in the case of digital controls, a separate control set for each attached working executive mechanism module which can be statically displayed on a screen or dynamically displayed on a screen when the operator toggles to, or selects, a specific working executive mechanism module to operate.

The power unit module(s) 13 are the power generation source for all necessary mechanisms for the functioning of the modular industrial vehicle, e.g., hydraulic, mechanical and electrical. Thus, when a module is connected to the modular industrial vehicle it receives power from the power unit module 13. Generally, this is accomplished by a wired connection between the individual module and the power unit module 13, however, wireless means of transmitting power is also contemplated by the present invention. To enable easy connectivity to the power unit module 13, each individual module may be outfitted with a power outlet and a power "plug" which can be coupled with that of another module. The power unit module 13 also can act as an independent source of power for electrical items commonly brought to a job site such as lighting, drills, saws and the like. The power unit module 13 can comprise an engine, turbine, reactor and generator which are set in a single enclosure with a power supply, such as a fuel tank. The power supply can be within the single enclosure or installed separately. Various configurations of the components of the power unit module to produce a working power generation source are well known to persons of ordinary skill in the art. The power supply can utilize any suitable source of energy known to persons of ordinary skill in the art including, but not limited to, gasoline, hydrogen, solar, natural gas, battery and the like. The power unit module 13 can also comprise a controller which communicates information about the technical specifications and configuration of the power unit module 13 to a managing controller. The power unit module 13 can be equipped with attachment means for attachment to other modules. Suitable attachment means include, but are not limited to, hooks, straps, slots, bolts, threads, pins, magnets, clamps and the like.

The frame module(s) 15 form the structure to which the working executive mechanism module(s), cabin module(s) 12 and power unit module(s) 13 can be attached. The frame module 15 also provides for the attachment of one or more movement modules 16 thereto. The combination of a frame module 15, a movement module 16 and optionally a wheel rotation module is referred to herein as a chassis module 14. The sides of a frame module 15 can be equipped with attachment means for attachment to other modules and also provides for the sequential connection of multiple frame modules 15. Suitable attachment means include, but are not limited to, hooks, straps, slots, bolts, threads, pins, magnets, clamps and the like. The frame pivot module 17 provides for the sequential connection of multiple frame modules 15 to provide a point of rotation, pivot, swivel or hinge in the modular industrial vehicle. The frame pivot module 17 can allow for quick-release so that different modules can be swapped with ease. The frame module 15 can also comprise a controller which communicates information about the technical specifications and configuration of the frame module 15 to a managing controller. When connecting frame modules 15, information is exchanged between the frame modules' 15 controllers and a managing controlling regarding the frame modules' 15 identification, location and specifications as well as the identity and location of the various modules attached on each frame module 15.

Embodiments of the present invention may employ one or more movement modules 16 of a wheel embodiment 16a or track embodiment 16b to attach to the underside of the frame module(s) 15 to create a rollable or moveable vehicle. In another embodiment of the present invention a movement module 16 of a wheel embodiment 16a or track embodiment 16b can attach directly to the one or more cabin modules 12, power unit modules 13 and/or working executive mechanism modules. The movement module 16 may include an engine, such as an electric or hydraulic engine, which powers the movement module 16. The movement module 16 may also be equipped with a brake and a reducer which increases its tractive power. The movement module 16 may also optionally include a gearbox to increase its tractive power. The movement module 16 can be equipped with attachment means for attachment to other modules. Suitable attachment means include, but are not limited to, hooks, straps, slots, bolts, threads, pins, magnets, clamps and the like. In some embodiments, a wheel embodiment of the movement module 16a is attached to a frame module 15 using a wheel rotation module 19. The wheel rotation module 19 allows for the rotation, turning or swivel of the wheel embodiment of the movement module 16a. The movement module 16 can also comprise a controller which communicates information about the technical specifications and configuration of the movement module 16 to a managing controller.

The working executive mechanism module(s) is attached upon the structure formed by the frame module(s) 15. The working executive mechanism module performs the special operations of the modular industrial vehicle and can be any type of mechanism designed for industry, construction, agriculture, utilities and the like known to those of ordinary skill in the art including, but not limited to, excavators, cranes, loaders, rollers, dumps, buses, garbage trucks, tows, boom lifts, wrecking balls, mixers, dozers (sometimes referred to as bulldozers), tractors, harvesters, reapers, threshers, shovels, plows, graders, rippers and the like. Possible embodiments are described in more detail below. The working executive mechanism module can be equipped with a controller, which when connected to the modular tractive complex, communicates to a managing controller the technical specifications of the working executive mechanism module for determination by the managing controller of the working executive mechanism module's performance and usability. This information is used by the managing controller to provide controls to the operator of the modular industrial vehicle that perform functions according to the technical specifications, operations and uses specific to the attached working executive mechanism module(s). The working executive mechanism module can be equipped with attachment means for attachment to other modules. Suitable attachment means include, but are not limited to, hooks, straps, slots, bolts, threads, pins, magnets, clamps and the like.

Figure 10:
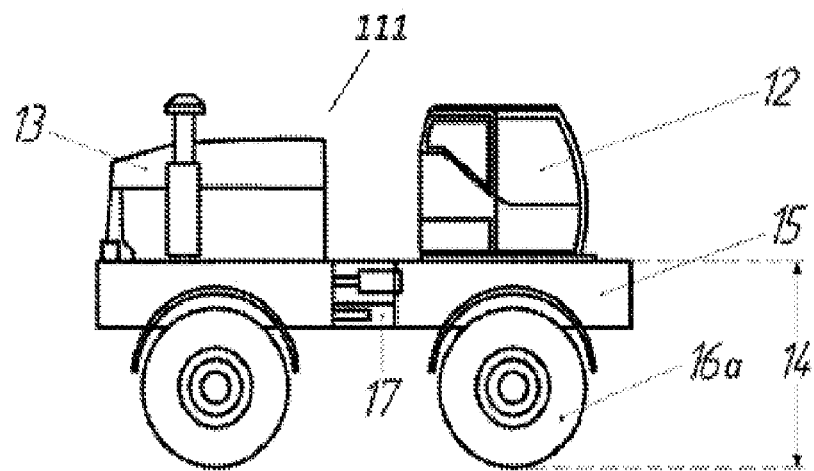
FIG. 10 is a side view of an embodiment of a modular tractive complex of the modular industrial vehicle of the present invention.
Figure 11:
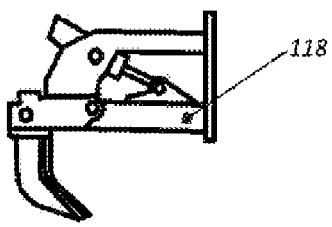
FIG. 11 is a side view of a tractor embodiment of a working executive mechanism module for use with the modular industrial vehicle of the present invention.
Figure 12:
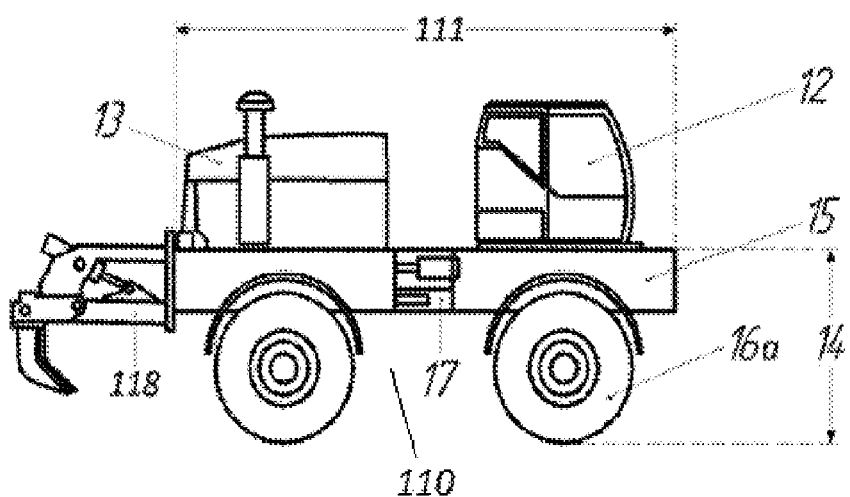
FIG. 12 is a side view of an embodiment of the modular industrial vehicle of the present invention configured as a tractor.

FIG. 10 depicts an embodiment of a modular tractive complex 111 of the modular industrial vehicle of the present invention comprising a cabin module 12, a power unit module 13, two chassis modules 14 each comprising a frame module 15 and a wheel embodiment of the movement module 16a and a frame pivot module 17. The modular tractive complex 111 of FIG. 10 is, without limitation, suitable for being configured as a tractor by attaching a tractor embodiment of the working executive mechanism module 118 as seen in FIG. 11 to form a modular industrial vehicle 110 configured as a tractor as seen in FIG. 12.

Figure 13:
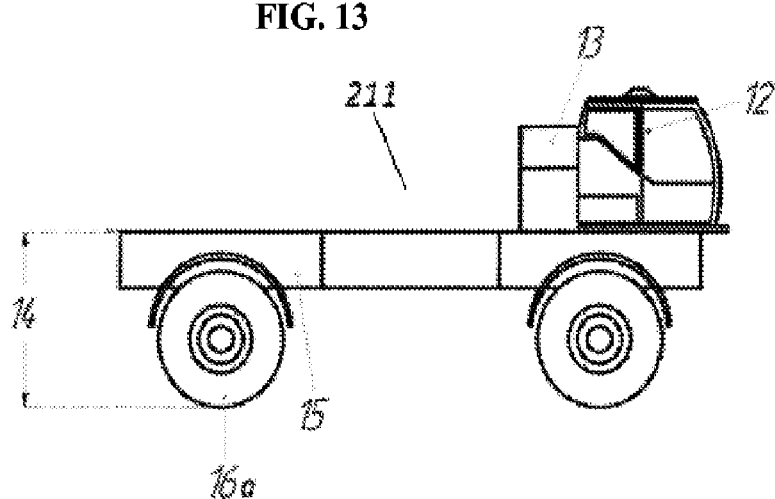
FIG. 13 is a side view of an embodiment of a modular tractive complex of the modular industrial vehicle of the present invention.
Figure 14:
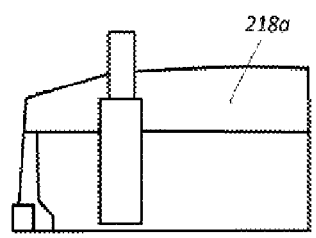
FIG. 14 is a side view of a harvester embodiment of a working executive mechanism module for use with the modular industrial vehicle of the present invention.
Figure 15:
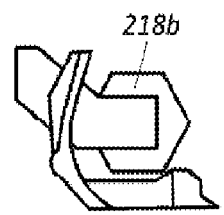
FIG. 15 is a side view of a reaper embodiment of a working executive mechanism module for use with the modular industrial vehicle of the present invention.
Figure 16:
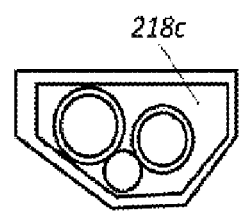
FIG. 16 is a side view of a thresher embodiment of a working executive mechanism module for use with the modular industrial vehicle of the present invention.
Figure 17:
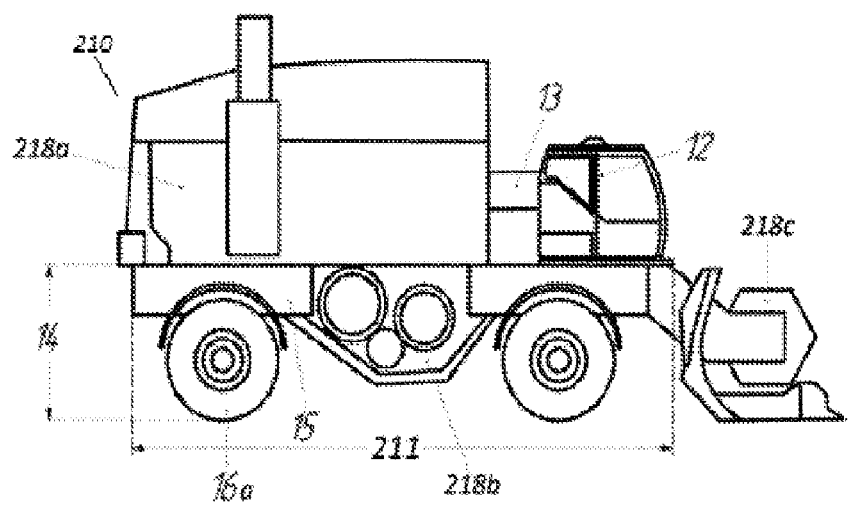
FIG. 17 is a side view of an embodiment of the modular industrial vehicle of the present invention configured as a combine.

FIG. 13 depicts an embodiment of a modular tractive complex 211 of the modular industrial vehicle of the present invention comprising a cabin module 12, a power unit module 13, two chassis modules 14 each comprising a frame module 15 and a wheel embodiment of the movement module 16a and an additional frame module 15. The modular tractive complex 211 of FIG. 13 is, without limitation, suitable for being configured as a combine by attaching reaper, thresher and harvester embodiments of the working executive mechanism modules 218a, 218b and 218c as seen in FIGS. 14-16, respectively, to form a modular industrial vehicle 210 configured as a combine as seen in FIG. 17.

Figure 18:
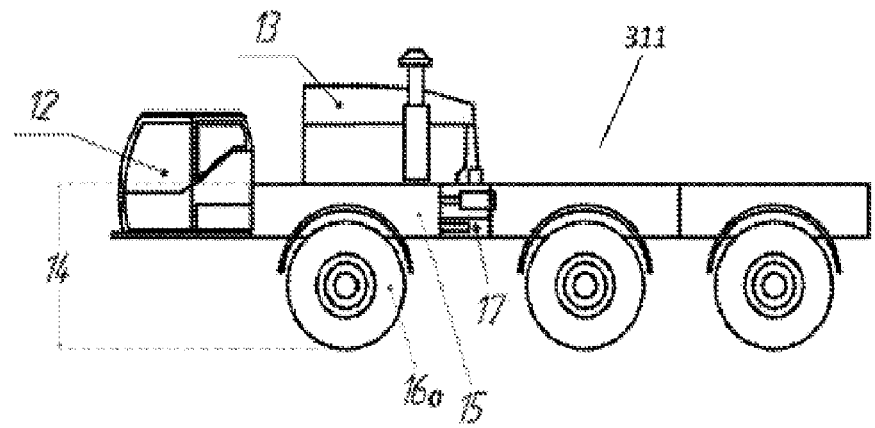
FIG. 18 is a side view of an embodiment of a modular tractive complex of the modular industrial vehicle of the present invention.
Figure 19:
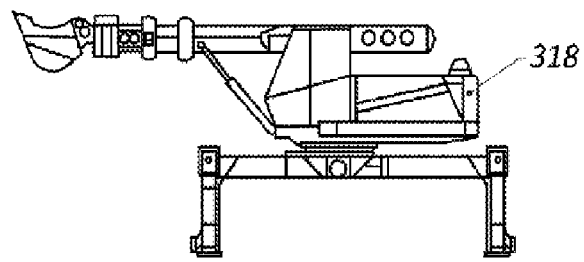
FIG. 19 is a side view of an excavator embodiment of a working executive mechanism module for use with the modular industrial vehicle of the present invention.
Figure 20:
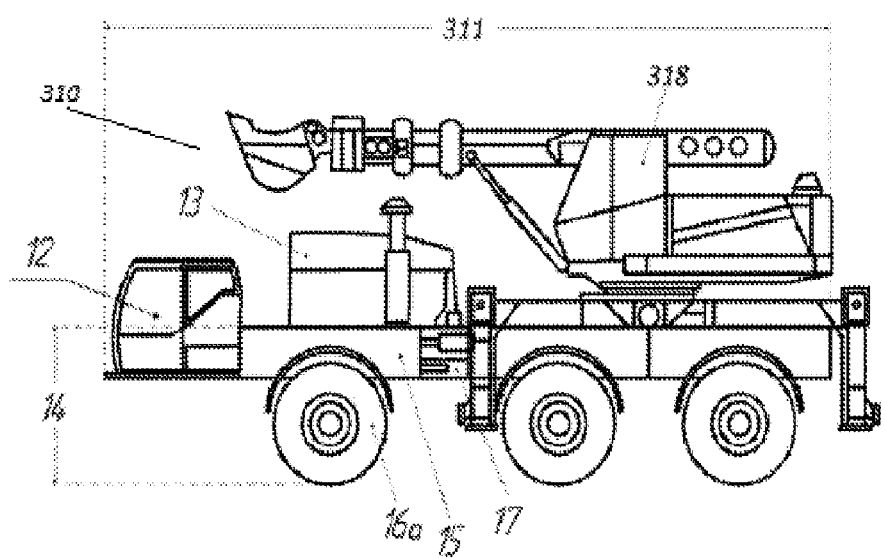
FIG. 20 is a side view of an embodiment of the modular industrial vehicle of the present invention configured as an excavator.

FIG. 18 depicts an embodiment of a modular tractive complex 311 of the modular industrial vehicle of the present invention comprising a cabin module 12, a power unit module 13, three chassis modules 14 each comprising a frame module 15 and a wheel embodiment of the movement module 16a and a frame pivot module 17. The modular tractive complex 311 of FIG. 18 is, without limitation, suitable for being configured as an excavator by attaching an excavator embodiment of the working executive mechanism module 318 as seen in FIG. 19 to form a modular industrial vehicle 310 configured as an excavator as seen in FIG. 20.

Figure 21:
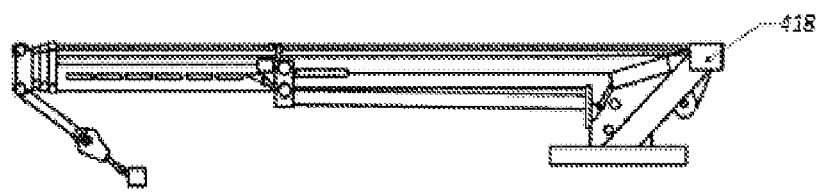
FIG. 21 is a side view of a crane embodiment of a working executive mechanism module for use with the modular industrial vehicle of the present invention.
Figure 22:
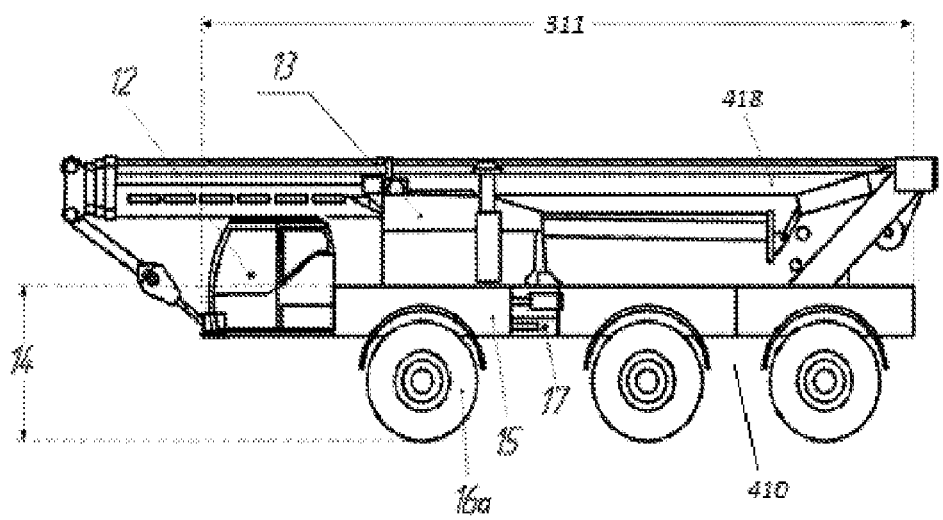
FIG. 22 is a side view of an embodiment of the modular industrial vehicle of the present invention configured as a crane.

The modular tractive complex 311 of FIG. 18 is also, without limitation, suitable for being configured as a crane by attaching a crane embodiment of the working executive mechanism module 418 as seen in FIG. 21 to form a modular industrial vehicle 410 configured as a crane as seen in FIG. 22.

Figure 23:
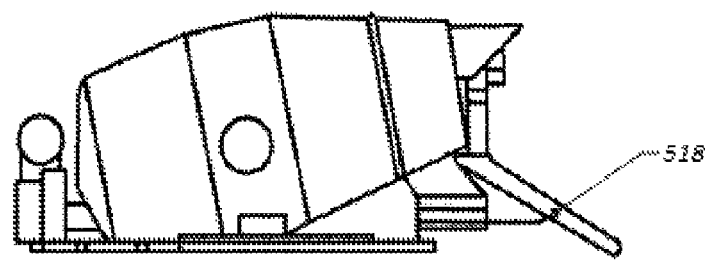
FIG. 23 is a side view of a mixer embodiment of a working executive mechanism module for use with the modular industrial vehicle of the present invention.
Figure 24:
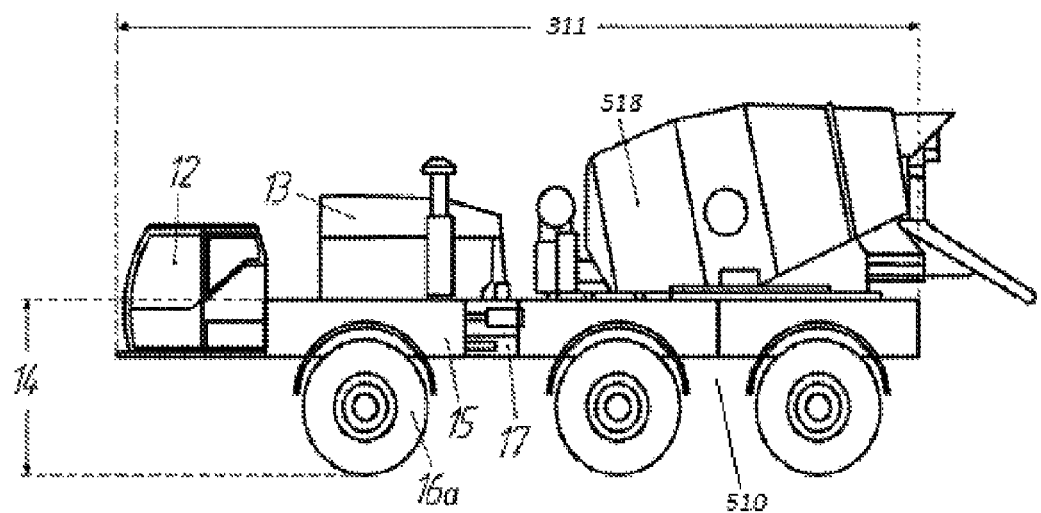
FIG. 24 is a side view of an embodiment of the modular industrial vehicle of the present invention configured as a mixer.

The modular tractive complex 311 of FIG. 18 is additionally, without limitation, suitable for being configured as a mixer by attaching a mixer embodiment of the working executive mechanism module 518 as seen in FIG. 23 to form a modular industrial vehicle 510 configured as a mixer as seen in FIG. 24.

Figure 25:
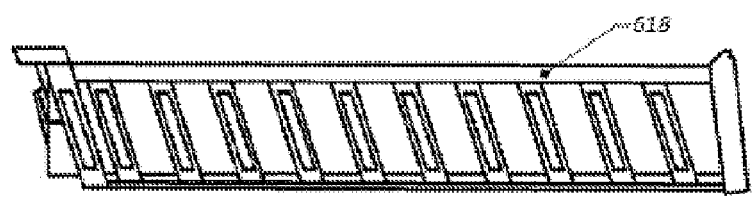
FIG. 25 is a side view of a dump embodiment of a working executive mechanism module for use with the modular industrial vehicle of the present invention.
Figure 26:
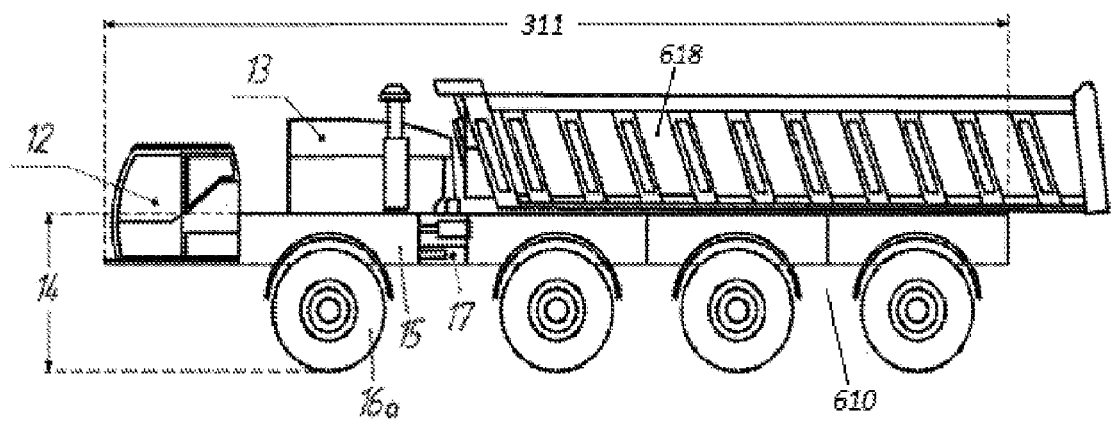
FIG. 26 is a side view of an embodiment of the modular industrial vehicle of the present invention configured as a dump.

The modular tractive complex 311 of FIG. 18 is further, without limitation, suitable for being configured as a dump by attaching a dump embodiment of the working executive mechanism module 618 as seen in FIG. 25 to form a modular industrial vehicle 610 configured as a dump as seen in FIG. 26.

Figure 27:
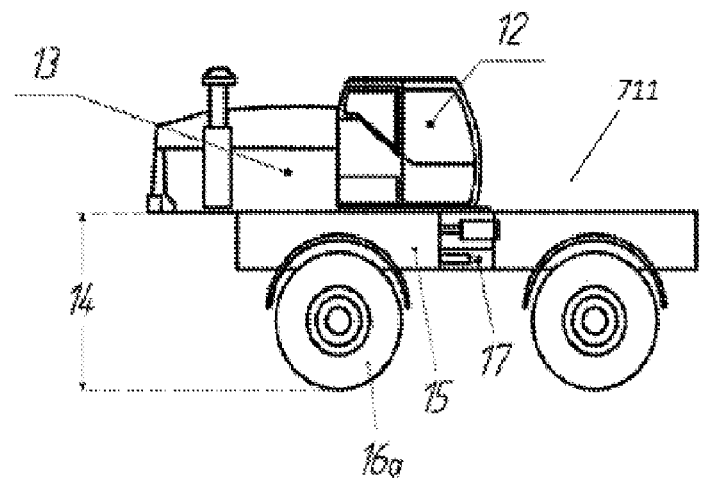
FIG. 27 is a side view of an embodiment of a modular tractive complex of the modular industrial vehicle of the present invention.
Figure 28:
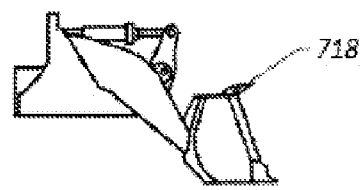
FIG. 28 is a side view of a loader embodiment of a working executive mechanism module for use with the modular industrial vehicle of the present invention.
Figure 29:
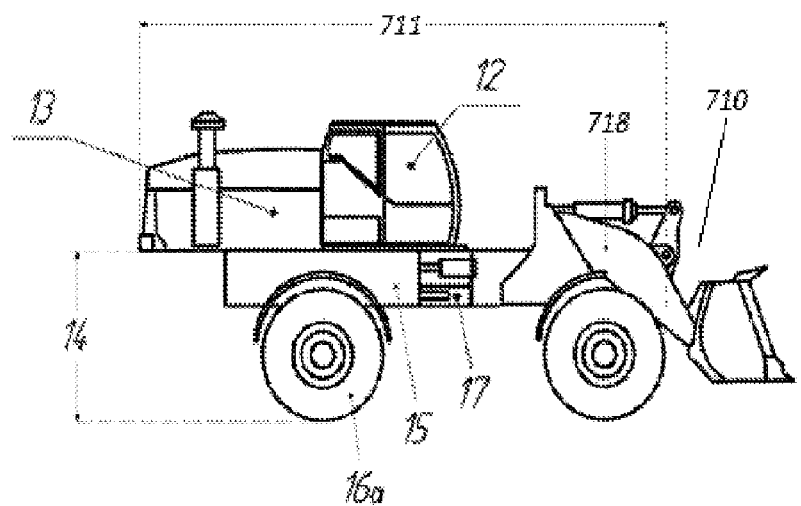
FIG. 29 is a side view of an embodiment of the modular industrial vehicle of the present invention configured as a loader.

FIG. 27 depicts an embodiment of a modular tractive complex 711 of the modular industrial vehicle of the present invention comprising a cabin module 12, a power unit module 13, two chassis modules 14 each comprising a frame module 15 and a wheel embodiment of the movement module 16a and a frame pivot module 17. The modular tractive complex 711 of FIG. 27 is, without limitation, suitable for being configured as a loader by attaching a loader embodiment of the working executive mechanism module 718 as seen in FIG. 28 to form a modular industrial vehicle 710 configured as a loader as seen in FIG. 29.

Figure 30:
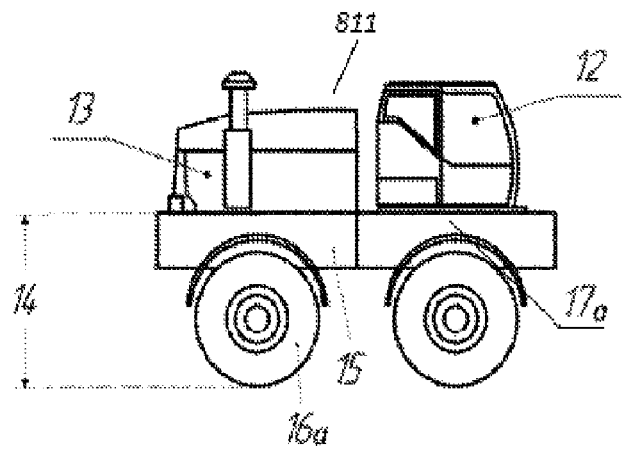
FIG. 30 is a side view of an embodiment of a modular tractive complex of the modular industrial vehicle of the present invention.
Figure 31:
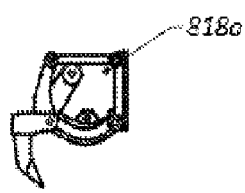
FIG. 31 is a side view of a ripper embodiment of a working executive mechanism module for use with the modular industrial vehicle of the present invention.
Figure 32:
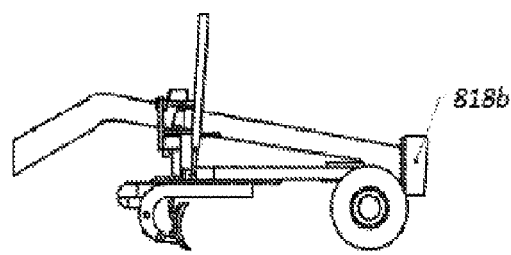
FIG. 32 is a side view of a grader embodiment of a working executive mechanism module for use with the modular industrial vehicle of the present invention.
Figure 33:
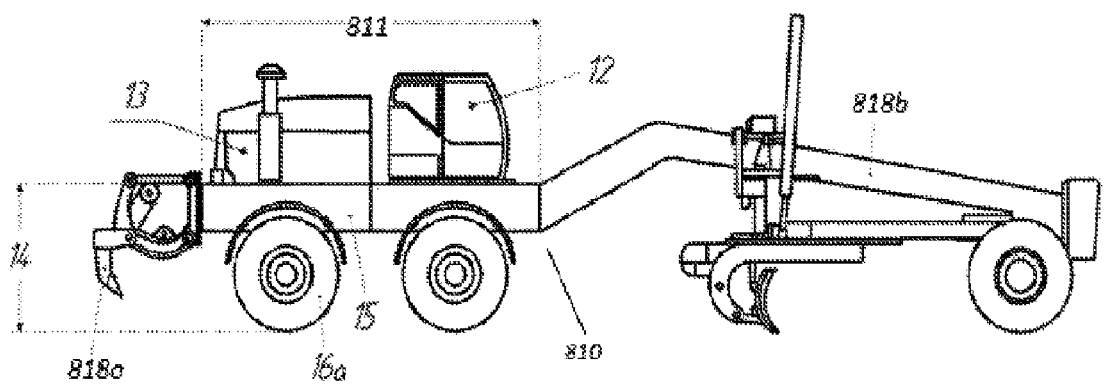
FIG. 33 is a side view of an embodiment of the modular industrial vehicle of the present invention configured as a grader with ripper.

FIG. 30 depicts an embodiment of a modular tractive complex 811 of the modular industrial vehicle of the present invention comprising a cabin module 12, a power unit module 13 and two chassis modules 14 each comprising a frame module 15 and a wheel embodiment of the movement module 16a. The modular tractive complex 811 of FIG. 30 is, without limitation, suitable for being configured as a grader with ripper by attaching ripper and grader embodiments of the working executive mechanism module 818a and 818b as seen in FIGS. 31 and 32, respectively, to form a modular industrial vehicle 810 configured as a grader with ripper as seen in FIG. 33.

Figure 34:
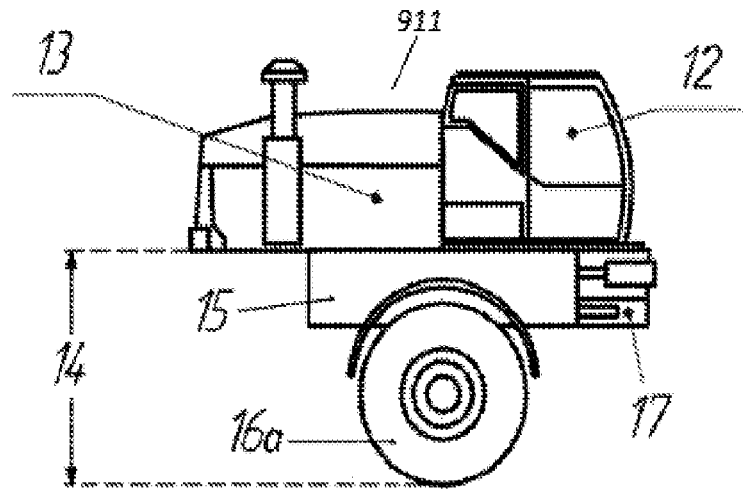
FIG. 34 is a side view of an embodiment of a modular tractive complex of the modular industrial vehicle of the present invention.
Figure 35:
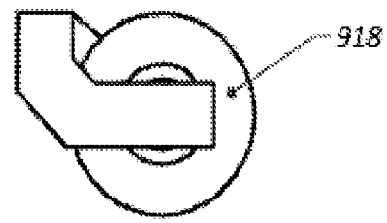
FIG. 35 is a side view of a roller embodiment of a working executive mechanism module for use with the modular industrial vehicle of the present invention.
Figure 36:
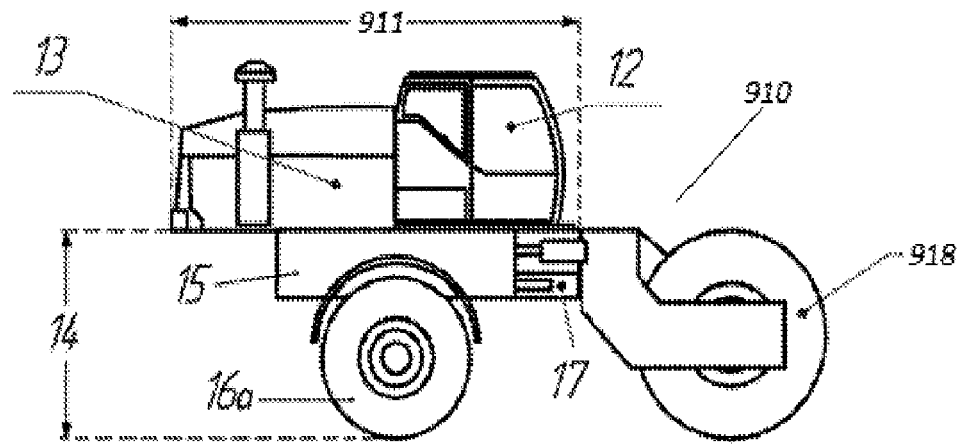
FIG. 36 is a side view of an embodiment of the modular industrial vehicle of the present invention configured as a roller.

FIG. 34 depicts an embodiment of a modular tractive complex 911 of the modular industrial vehicle of the present invention comprising a cabin module 12, a power unit module 13, a chassis module 14 comprising a frame module 15 and a wheel embodiment of the movement module 16a and a frame pivot module 17. The modular tractive complex 811 of FIG. 34 is, without limitation, suitable for being configured as a roller by attaching a roller embodiment of the working executive mechanism module 918 as seen in FIG. 35 to form a modular industrial vehicle 910 configured as a roller as shown in FIG. 36.

Figure 37:
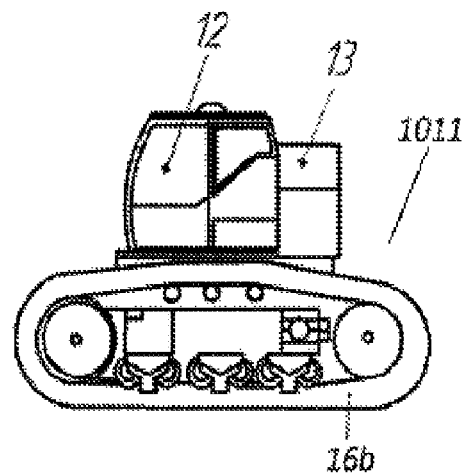
FIG. 37 is a side view of an embodiment of a modular tractive complex of the modular industrial vehicle of the present invention.
Figure 38:
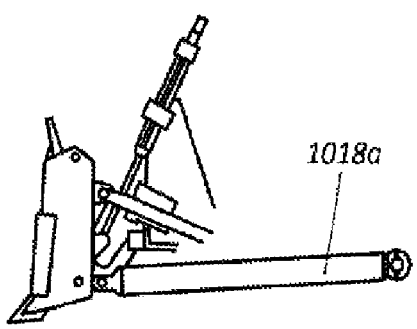
FIG. 38 is a side view of a dozer shovel embodiment of a working executive mechanism module for use with the modular industrial vehicle of the present invention.
Figure 39:
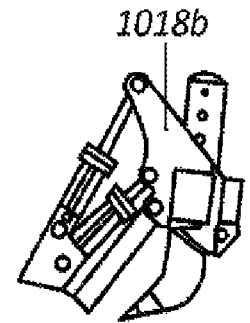
FIG. 39 is a side view of a dozer ripper embodiment of a working executive mechanism module for use with the modular industrial vehicle of the present invention.
Figure 40:
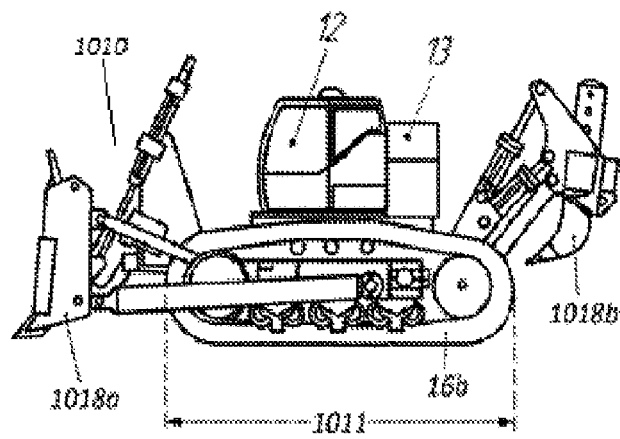
FIG. 40 is a side view of an embodiment of the modular industrial vehicle of the present invention configured as a dozer.

FIG. 37 depicts an embodiment of a modular tractive complex 1011 of the modular industrial vehicle of the present invention comprising a cabin module 12, a power unit module 13 and a track embodiment of the movement module 16b. The modular tractive complex 1011 of FIG. 37 is, without limitation, suitable for being configured as a dozer by attaching dozer shovel and dozer ripper embodiments of the working executive mechanism module 1018a and 1018b as seen in FIGS. 38 and 39, respectively, to form a modular industrial vehicle 1010 configured as a dozer as seen in FIG. 40.

The invention illustratively described herein suitably may be practiced in the absence of any element or elements, limitation or limitations, which is not specifically disclosed herein. Thus, for example, in each instance herein, any of the terms "comprising," "consisting essentially of" and "consisting of" may be replaced with either of the other two terms. The terms and expressions that have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

The invention claimed is:

1. A modular industrial vehicle comprising operator controls and a working executive mechanism module selected from the group consisting of an excavator, a crane, a loader, a roller, a dump, a bus, a garbage compactor, a tow, a boom lift, a wrecking ball, a mixer, a dozer, a tractor, a harvester, a reaper, a thresher, a shovel, a plow, a grader, a ripper, and combinations thereof,
   wherein the working executive mechanism comprises a controller that is in communication with a managing controller,
   wherein the managing controller is in communication with a database containing data comprising operative capabilities of the working executive mechanism module, and
   wherein upon connection of the working executive mechanism module to the modular industrial vehicle the controller communicates the technical specifications of the working executive mechanism module to the managing controller and the managing controller retrieves the operative capabilities of the working executive mechanism module from the database and provides an operating mode for the operator controls specific to the operative capabilities of the working executive mechanism.

2. A modular industrial vehicle which comprises:
   a) a cabin module that comprises operator controls;
   b) a power unit module;
   c) a chassis module that comprises:
      i) a frame module;
      ii) a movement module; and
      iii) optionally a wheel rotation module; and
   d) a working executive mechanism module;

wherein at least the working executive mechanism module comprises a controller that is in communication with a managing controller, wherein the managing controller is in communication with a database containing data comprising operative capabilities of the working executive mechanism module, and wherein upon connection of the working executive mechanism module to the modular industrial vehicle the controller communicates the technical specifications of the working executive mechanism module to the managing controller and the managing controller retrieves the operative capabilities of the working executive mechanism module from the database and provides an operating mode for the operator controls specific to the operative capabilities of the working executive mechanism.

3. The modular industrial vehicle of claim 2 wherein the operator controls are a touch-screen interface.

4. The modular industrial vehicle of claim 2 wherein the one or more movement modules comprise wheels, tracks or a combination of wheels and tracks.

5. The modular industrial vehicle of claim 2 wherein the working executive mechanism is selected from the group consisting of an excavator, a crane, a loader, a roller, a dump, a bus, a garbage compactor, a tow, a boom lift, a wrecking ball, a mixer, a dozer, a tractor, a harvester, a reaper, a thresher, a shovel, a plow, a grader, a ripper, and combinations thereof.

6. A modular industrial vehicle comprising:
a) a cabin module that comprises operator controls;
b) a power unit module;
c) a movement module; and
d) a working executive mechanism module;

wherein at least the working executive mechanism module comprises a controller that is in communication with a managing controller, wherein the managing controller is in communication with a database containing data comprising operative capabilities of the working executive mechanism module, and wherein upon connection of the working executive mechanism module to the modular industrial vehicle the controller communicates the technical specifications of the working executive mechanism module to the managing controller and the managing controller retrieves the operative capabilities of the working executive mechanism module from the database and provides an operating mode for the operator controls specific to the operative capabilities of the working executive mechanism.

7. The modular industrial vehicle of claim 6 wherein the operator controls are a touch-screen interface.

8. The modular industrial vehicle of claim 6 wherein the one or more movement modules comprise wheels, tracks or a combination of wheels and tracks.

9. The modular industrial vehicle of claim 6 wherein the working executive mechanism is selected from the group consisting of an excavator, a crane, a loader, a roller, a dump, a bus, a garbage compactor, a tow, a boom lift, a wrecking ball, a mixer, a dozer, a tractor, a harvester, a reaper, a thresher, a shovel, a plow, a grader, a ripper, and combinations thereof.

10. The modular industrial vehicle of claim 1 wherein the working executive mechanism is a mixer and the operating mode for the operator controls comprise spinning the mixer and pouring contents from the mixer.

11. The modular industrial vehicle of claim 2 wherein the working executive mechanism is a mixer and the operating mode for the operator controls comprise spinning the mixer and pouring contents from the mixer.

12. The modular industrial vehicle of claim 6 wherein the working executive mechanism is a mixer and the operating mode for the operator controls comprise spinning the mixer and pouring contents from the mixer.

13. The modular industrial vehicle of claim 1 wherein the working executive mechanism is a crane and the operating mode for the operator controls comprise raising a lift of the crane and rotating the lift of the crane.

14. The modular industrial vehicle of claim 2 wherein the working executive mechanism is a crane and the operating mode for the operator controls comprise raising a lift of the crane and rotating the lift of the crane.

15. The modular industrial vehicle of claim 6 wherein the working executive mechanism is a crane and the operating mode for the operator controls comprise raising a lift of the crane and rotating the lift of the crane.

16. The modular industrial vehicle of claim 2 wherein the frame module comprises a controller that is in communication with the managing controller, wherein the database contains data comprising operative capabilities of the frame module, and wherein upon connection of the frame module to the modular industrial vehicle the controller of the frame module communicates the technical specifications of the frame module to the managing controller and the managing controller retrieves the operative capabilities of the frame module from the database and provides an operating mode for the operator controls specific to the operative capabilities of the frame module.

17. The modular industrial vehicle of claim 6 wherein the movement module comprises a controller that is in communication with the managing controller, wherein the database contains data comprising operative capabilities of the movement module, and wherein upon connection of the movement module to the modular industrial vehicle the controller of the movement module communicates the technical specifications of the movement module to the managing controller and the managing controller retrieves the operative capabilities of the movement module from the database and provides an operating mode for the operator controls specific to the operative capabilities of the movement module.

* * * * *